(12) United States Patent
Stucki

(10) Patent No.: US 8,783,613 B2
(45) Date of Patent: Jul. 22, 2014

(54) OBSERVATION PORT AND A HELICOPTER CABIN

(75) Inventor: Martin Stucki, Pfäffikon (CH)

(73) Assignee: Marenco Swisshelicopter Design AG, Mollis (CH)

(*) Notice: Subject to any disclaimer, the term of this patent is extended or adjusted under 35 U.S.C. 154(b) by 131 days.

(21) Appl. No.: 13/405,838

(22) Filed: Feb. 27, 2012

(65) Prior Publication Data

US 2012/0217345 A1 Aug. 30, 2012

(30) Foreign Application Priority Data

Feb. 28, 2011 (CH) ...................................... 0346/11

(51) Int. Cl.
*B64C 1/14* (2006.01)

(52) U.S. Cl.
USPC ...................................................... 244/129.3

(58) Field of Classification Search
USPC ............ 244/117 R, 129.3, 129.4, 129.5, 133
See application file for complete search history.

(56) References Cited

U.S. PATENT DOCUMENTS

2010/0206988 A1  8/2010  Woodland

FOREIGN PATENT DOCUMENTS

WO    2009/051711 A1    4/2009

OTHER PUBLICATIONS

IBTimes, "See-through planes of Airbus on anvil", Sep. 20, 2010, http://www.ibtimes.com/see-through-planes-airbus-anvil-246682.*

* cited by examiner

*Primary Examiner* — Isam Alsomiri
*Assistant Examiner* — Valentina Xavier
(74) *Attorney, Agent, or Firm* — Fleit Gibbons Gutman Bongini Bianco PL; Marty Fleit; Paul D. Bianco

(57) ABSTRACT

An observation port (4) in a primary structure (13) of a helicopter cabin (0) is disclosed, which is arranged between a pilot's seat (2) and a co-pilot's seat (3). The observation port (4) is delimited from the interior by an inner screen (15), and from the atmosphere by an outer screen (16), wherein the pilot can observe the space underneath the helicopter cabin (0) through the observation port (4). As a result of the configuration of the observation port (4) the pilot can assume an ergonomic and relaxed seating position at any time, even when he is executing flights with suspended loads. By means of the observation port (4) and the windows (15, 16), which extend laterally between the two pilots' seats (2, 3), a novel unrestricted vertical visual frame of reference onto the suspended load is achieved, wherein the length of the load cable has practically no influence.

20 Claims, 4 Drawing Sheets

OBSERVATION PORT AND A HELICOPTER CABIN

TECHNICAL FIELD

The present invention describes an observation port and a helicopter cabin with an observation port.

STATE OF THE PRIOR ART

The view of the pilot underneath a rotary wing aircraft or rotorcraft, in particular a helicopter, is of very great importance in some circumstances.

In order to be able to pick up loads by means of a helicopter it is desirable to manoeuvre the helicopter into a vertical position above the load. The position of the load hook, which is attached with the load cable to the load attachment point of the helicopter, should be held as vertically as possible above the position of the load in order to be able to lift the load without any horizontal movement. This is very important, since an oscillating load underneath a rotary wing aircraft can be very dangerous and for reasons of flight safety must be avoided at all costs.

In order to ensure the view of a pilot approximately vertically downwards under the fuselage structure of the helicopter curved perspex doors are used on the right-hand side of the pilot, so-called bubble doors, such as are described for example in WO2009/051711.

The latter describes a glass door, which can be simply fitted into a sidewall of a fuselage structure of an aircraft. One person can sit on a special seat in the region of the sidewall, and in accordance with a special form of embodiment can position his feet on a floor plate in the lower part of the bubble door. As a result of the outwardly curved shape of the bubble door an observer sitting on the seat can look externally past the fuselage structure of the aircraft and partially underneath the fuselage structure. The passenger sitting on the special seat does not intervene in the control of the helicopter; his task is limited to observation of the space underneath the fuselage structure.

If a bubble door has been arranged in the door on the right-hand side of the pilot it would be possible for a pilot sitting on the right-hand side in a helicopter to look underneath the rotary aircraft.

In addition to the bubble doors so-called "vertical reference floor windows" of known art can be fitted in the surface of the cabin floor of the fuselage structure; these are obtainable in various sizes for some helicopter models. These windows are fitted in the surface of the cabin floor between the pilot's seat and the door in the region of the right-hand side of the pilot. With these the pilot can estimate the vertical height of the helicopter, whereby he must look through the window past the right-hand half of his body.

With today's aids such as the bubble door and vertical reference floor windows it is possible for the pilot to see the suspended load. However large upper body movements on the pilot's seat are necessary in order to move the head into the curved door or above the vertical reference floor window. In particular in the case of short cable lengths the pilot must bend to the right to an even greater extent in order to see the suspended load. The pilot's severely bent position to the right, which is bent away from the collective pitch control lever, which is located on the left, requires a lengthening of the collective pitch control lever.

Since during suspended load tasks the head of the pilot is inclined far to the right out of the window, the instruments that are installed centrally in the instrument panel can only be checked with difficulty, or only with large head and upper body movements.

Should, for example, electronic and/or mechanical failures of the engine control system occur, the pilot is forced to regulate the engine parameters manually via the throttle twistgrip, which sits on the collective pitch control lever. If a suspended load flight is now undertaken with the above described viewing options, the left hand does not cover the throttle twistgrip; in the event of a technical engine control problem the consequence is a movement of the whole body and, naturally, a movement of the hand from the lengthened collective pitch control lever to the throttle twistgrip.

While demanding requirements are already placed on the pilot when the engine control system is in a fault-free state, in the event of failures as described above the level of flight safety is severely reduced.

In order to improve the view downwards the situation has been managed for a long time by the fitting of mirrors, or else the pilot has positioned himself on the left-hand seat, which is not possible for all helicopter models, and in some circumstances is only achievable with an extensive rework and additional certification. Since the view underneath the aircraft is often severely hindered by the cabin floor, the skids, installed footboards, and even skis, improvement of the view by means of these aids also has its limits; furthermore the pilot is clearly deviating from a relaxed seating and control position.

PRESENTATION OF THE INVENTION

The present invention has set itself the task of providing a rotary wing aircraft in which the view onto a suspended load is achieved such that the seating and control comfort for the pilot is improved. A further task consists in the achievement of an improved level of flight safety, since the pilot can perform flight manoeuvres with the suspended load in a relaxed manner with low levels of fatigue.

By means of the configuration of a rotary wing aircraft with an observation port arranged in the cabin floor, which is arranged between the pilot's seat and the co-pilot's seat in the forward direction of the rotary wing aircraft, this task is achieved, whereby the pilot has an unhindered view underneath the aircraft without any excessive head rotation.

The advantages achieved by the invention are essentially to be seen in the fact that the pilot, in addition to a direct, unhindered, and at the same time realistic view of the space underneath the helicopter at all times, is able to have an ergonomic seating position, which enables him simply to change his viewing direction between the space underneath the aircraft and the instrument parameters, without any upper body movement.

The position of the pilot is inclined towards the interior of the helicopter, which in turn improves his ability to reach the controls, and thus increases the level of flight safety.

By means of the observation port configuration the possibility is created of a view underneath the helicopter with which the stability of the primary structure, and in particular the cabin floor, is not weakened. In fact the design of the observation port has a stabilising influence on the primary structure.

BRIEF DESCRIPTION OF THE FIGURES

A preferred example of embodiment of the subject of the invention is described in what follows, in conjunction with the accompanying drawings.

FIG. 1 shows a plan view onto a helicopter cabin, wherein the main rotor and the tail rotor have been omitted, while

FIG. 3 shows a part plan view onto a helicopter with a line of cut A-A that deviates slightly from the longitudinal axis, while

DESCRIPTION

Figure 1:
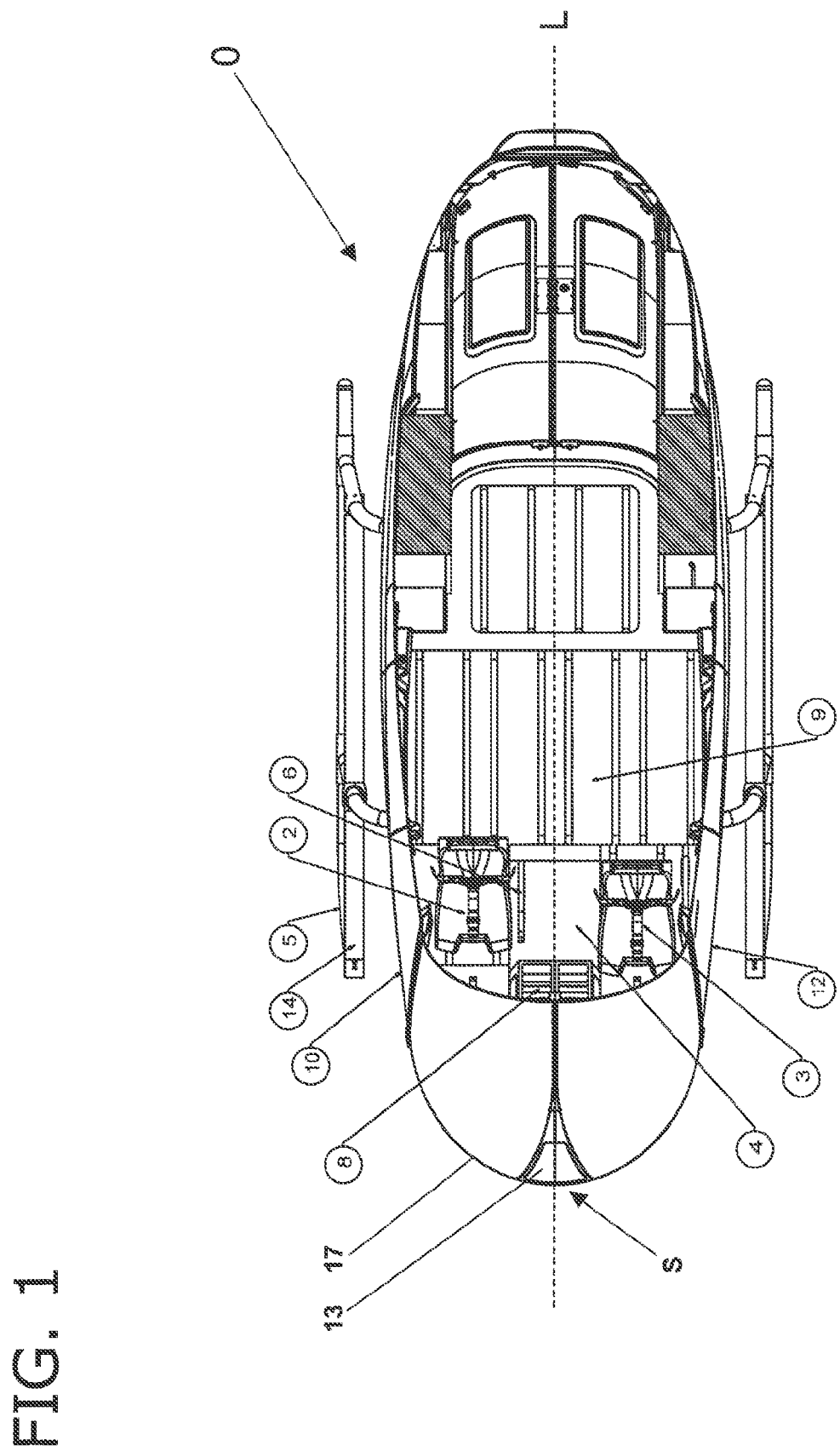

FIG. 1 shows a view into a helicopter cabin, wherein the main rotor and the tail rotor have been omitted for purposes of simplification. The nose of the helicopter cabin 0 is designated by S, and the longitudinal axis of the helicopter cabin 0 is designated by L. For the present invention it is the configuration of the cockpit region, and in particular near the nose S of the helicopter cabin 0, that is of interest.

A cabin floor 9 covers a primary structure 13 of the helicopter cabin 0. On the load-bearing primary structure skid tubes 5 and footboards 14 are arranged on both sides, such that the helicopter cabin can be set down on the skid tubes 5. The primary structure 13 is at least partly surrounded with an outer skin 17, as a result of which a helicopter cabin 0 is formed that is at least partly enclosed. In addition to perspex the primary structure 13 and the outer skin 17 consist essentially of metal or fibre composite material struts that form the helicopter cabin 0.

As viewed from the interior in the direction of the nose S, a pilot's seat 2 is fitted on the right-hand side of the helicopter cabin 0. On the corresponding left-hand side of the helicopter cabin 0 the co-pilot's seat 3 is located inside the cockpit. If mention is made in this application of "right" or "right-hand side" what is meant in each case is the pilot's seat 2 side, and thus the right-hand side as viewed from the interior onto the nose S. Between the pilot's seat 2 and the co-pilot's seat 3 is arranged a cockpit input console 8, which is operated during control of the helicopter cabin 0, i.e. of the helicopter. Directly near the pilot's seat 2, and in particular spaced apart from the pilot's seat 2 in the direction of the longitudinal axis L, is located the collective pitch control lever 6, which serves to provide collective adjustment of the pitch angle of all rotor blades.

A pilot's seat door 10, as part of the outer skin 17, serves to provide access to the pilot's seat 2 on the right-hand side, and a co-pilot's seat door 12 on the left-hand side correspondingly provides access to the co-pilot's seat 3.

In order to achieve the view under the cabin floor 9, an observation port 4 is provided, which is arranged between the pilot's seat 2 and the co-pilot's seat 3.

Figure 2:
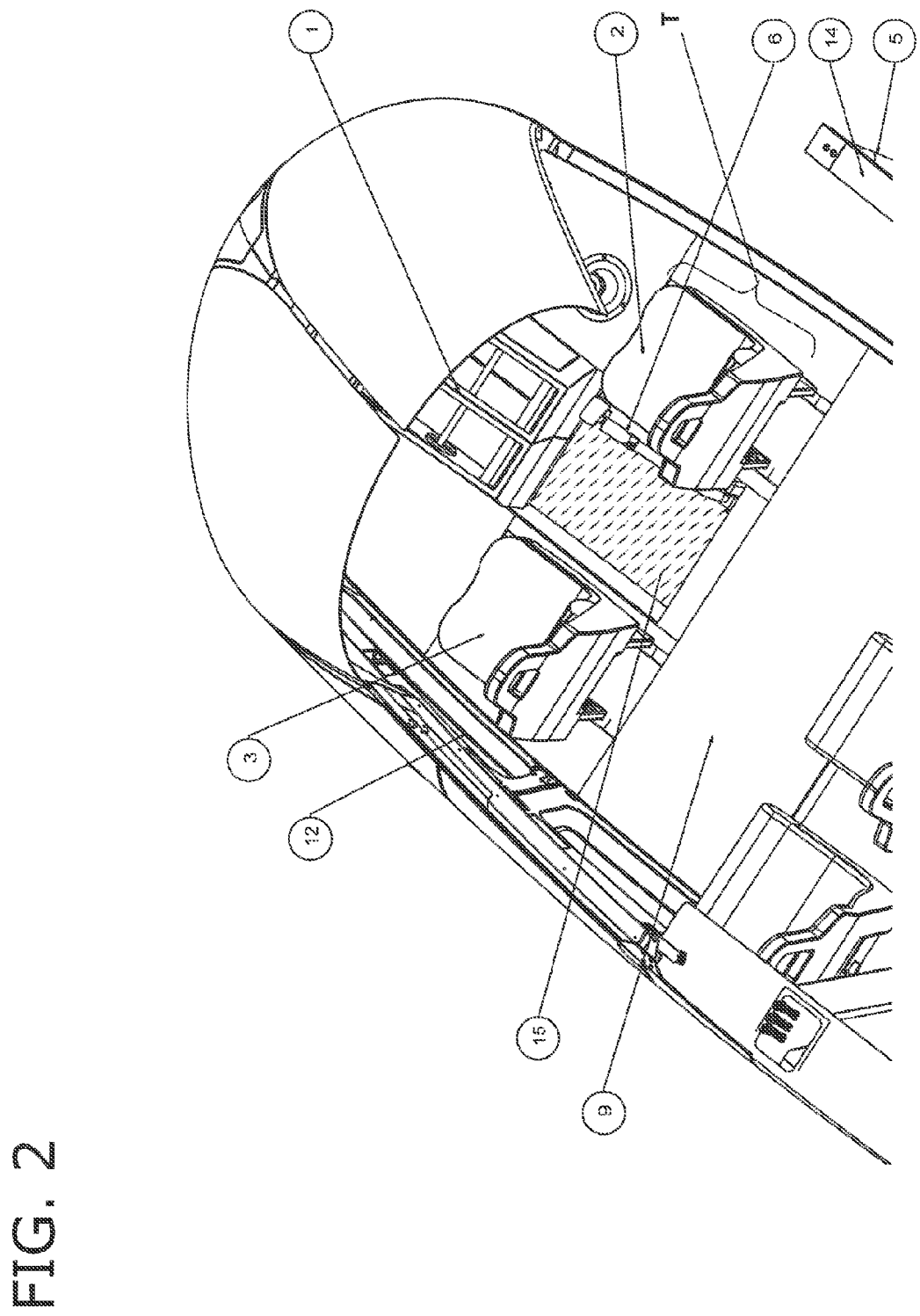
FIG. 2 shows a perspective view of part of an interior of a helicopter cabin without the main rotor, as per FIG. 1.

In FIG. 2 an inner screen 15 of the observation port 4 can be discerned; this is arranged to the left of the pilot's seat 2. This inner screen 15 is accessible from the interior of the helicopter cabin 0, and is configured to be transparent. The observation port 4 opening extends approximately from the instrument panel 1 to the backrest of the pilot's seat 2, and is completely covered with the inner screen 15.

As represented in FIG. 2, the view downwards through the observation port 4 is possible without restrictions, wherein no components such as skid tubes 5, footboards 14, parts of the control system, or cabling, for example, disturb the view underneath the cabin floor 9. With a slight lowering of his head a pilot on the pilot's seat has a large angle of view, across the inner screen 15 and the whole observation port 4, under the cabin floor 9. The instrument panel 1 in the region of the cockpit input console 8 can be operated by the pilot without much effort, even while he is observing events occurring approximately vertically underneath the cabin floor 9.

The observation port 4 is delimited by the inner screen 15 from the interior of the helicopter cabin 0; the screen is preferably flush with the plane of the cabin floor 9. The inner screen 15 is arranged laterally between the pilot's seat 2 and the co-pilot's seat 3. The length of the inner screen 15 in the direction of the longitudinal axis L of the helicopter cabin 0 corresponds approximately to the depth T of the seat squab and backrest of the pilot's seat 2.

Figure 3:
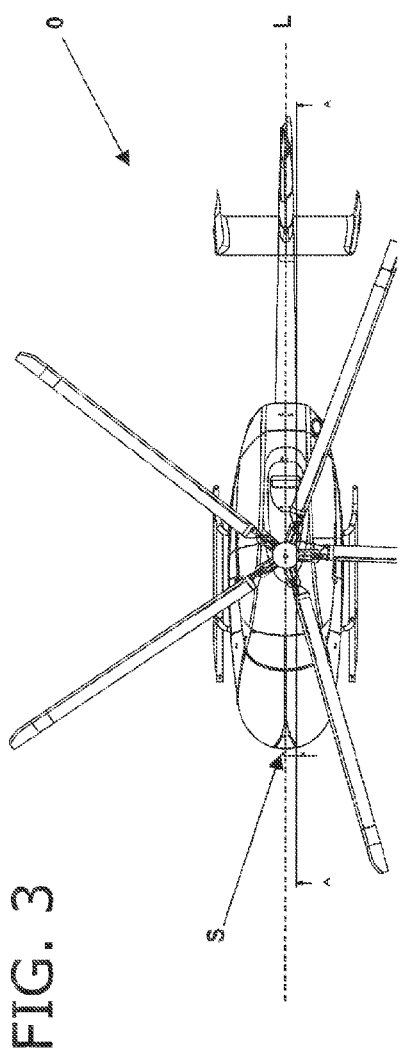
Figure 4:
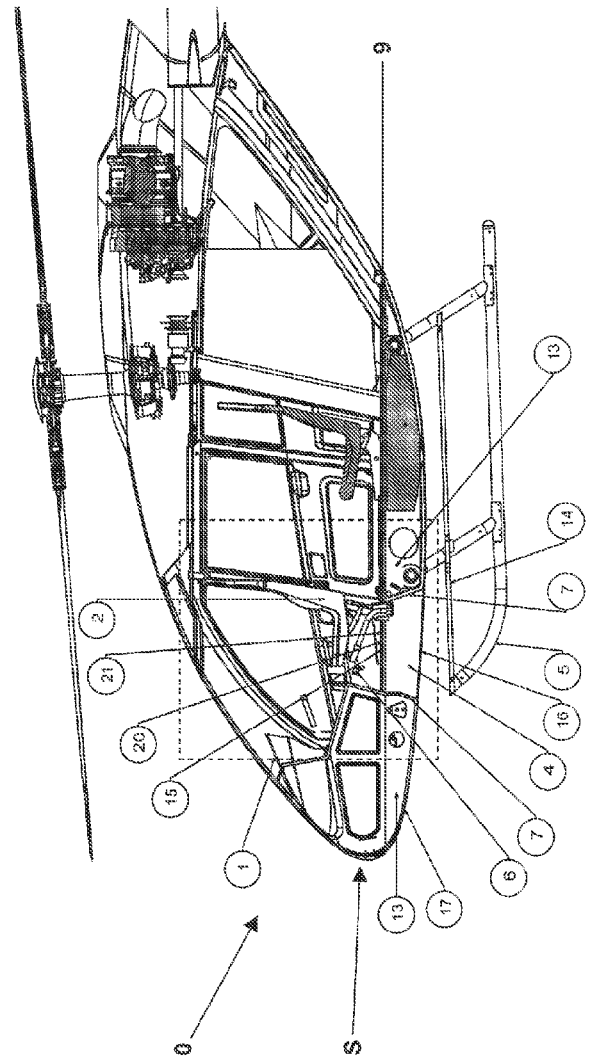
FIG. 4 shows a longitudinal section along the line of cut A-A from FIG. 3.

The configuration of the observation port 4 is clarified in a longitudinal section as per FIG. 4, which is executed along the line of cut A-A in FIG. 3.

The observation port 4 is located in the primary structure 13 of the helicopter cabin 0, and extends completely across the primary structure 13. Here an appropriate space is left vacant in the primary structure 13, into which the observation port 4 is introduced.

The stability of the inner screen 15 can be designed in accordance with the load-bearing capacity of the cabin floor 9, such that it can be walked upon. When personnel are being transported the inner screen 15 can additionally be protected by a covering, for example, a roller shutter, or similar. However, it is also conceivable to mount the inner screen 15 such that it is attached to the opening of the observation port 4 in a releasable manner, such that the inner screen 15 can be replaced by a correspondingly shaped floor insert 21. The floor insert 21 could then be embodied such that when personnel are being transported 3 seats can be positioned in the front row.

On the side of the observation port 4 that is facing the atmosphere, opposite to the interior of the helicopter cabin 0; the observation port 4 is delimited by an outer screen 16, which is preferably flush with the plane of the outer skin 17 of the primary structure 13. By this means the aerodynamic properties of the outer skin 17 remain almost unaltered. The observation port 4 is thus designed to be closed off from both the interior of the helicopter cabin 0 and the atmosphere.

Figure 5:
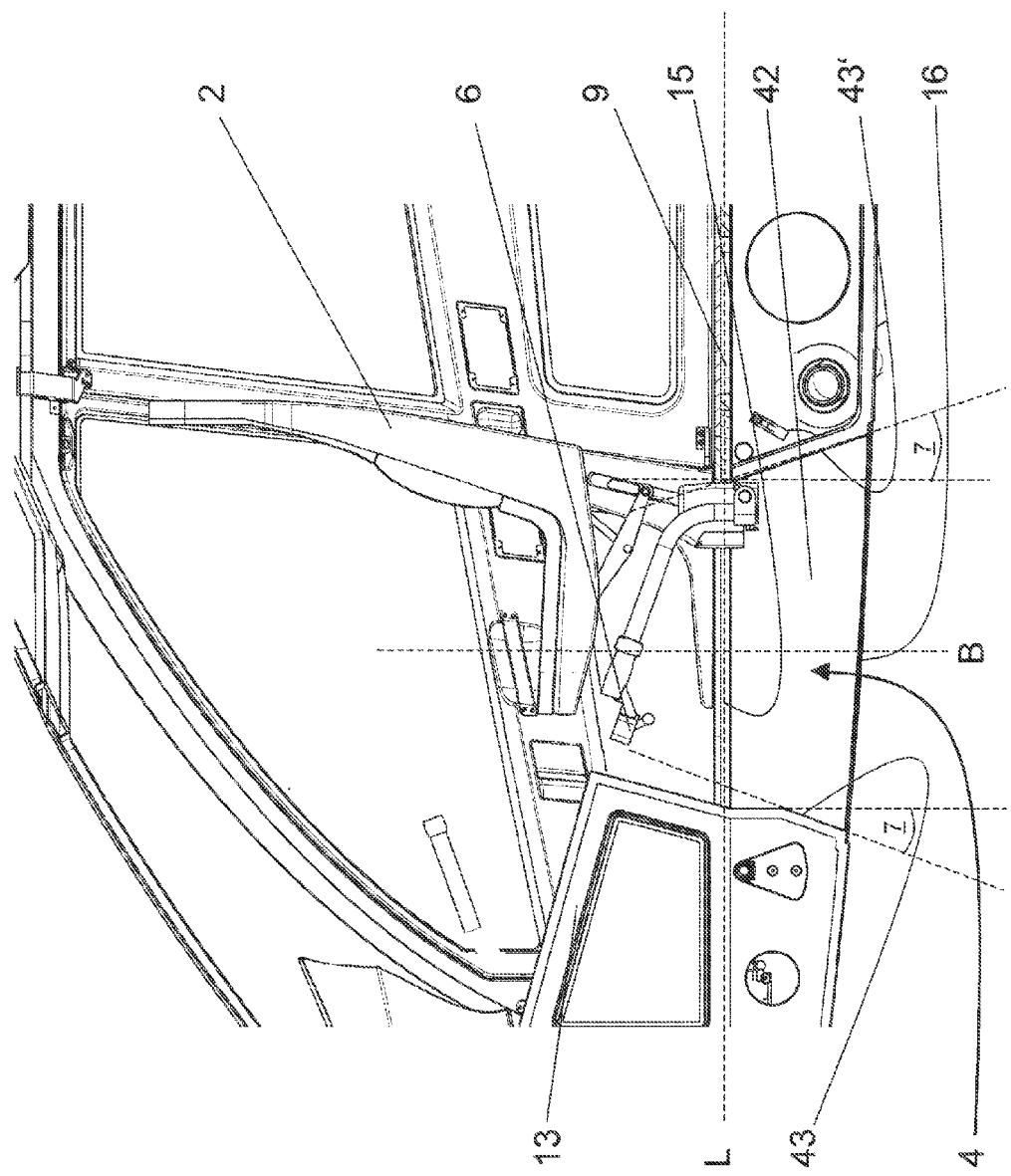
FIG. 5 shows a detailed longitudinal section in accordance with the rectangle identified in FIG. 4.

The observation port 4 is formed by two longitudinal walls 42, whereby only one longitudinal wall 42 can be discerned in FIG. 5. Both longitudinal walls 42 run at least approximately parallel to the longitudinal axis L and to one another.

A front transverse wall 43 and a rear transverse wall 43' running at least approximately at right-angles to the longitudinal axis L, delimit the observation port 4, at front and rear in the direction of the longitudinal axis L, from the primary structure 13.

In order to increase the visual frame of reference even with differing load cable lengths, at least one part of at east one of the transverse walls 43, 43' can be arranged at an opening angle 7 greater than 0° between an observation port longitudinal axis B and the at least one part of the respective transverse wall 43, 43'. In particular the selection of an opening angle of at least approximately 10° between at least one of the transverse walls 43, 43' and the observation port longitudinal axis B is advantageous. This is represented in FIG. 5. The cross-section of the observation port 4 is thus correspondingly increased from the interior to the side of the helicopter cabin 0 facing the atmosphere.

The figures represented here show the longitudinal walls 42 and the transverse walls 43, 43' in each case as part of the primary structure; these are appropriately shaped for the design of the observation port 4. However, it is also possible to introduce an observation port 4 into a recess of the primary structure 13. The observation port 4 is mounted such that it can be removed from the recess in the primary structure 13.

In order to enable an optimum view, inner screen 15 and outer screen 16 must be embodied in a transparent manner. In order to achieve in addition a certain magnification effect, the inner screen 15 and/or the outer screen 16 can be embodied in a concave or convex manner.

In addition for purposes of observing and monitoring the position of the load hook mirrors can be introduced directly into the observation port 4 without complex mirror fixtures, and secured there, By means of this arrangement of mirrors the aerodynamic properties of the aircraft are not impaired, since the mirrors are fully surrounded by the longitudinal walls 42 and transverse walls 43, 43'.

The viewing window length 4 can be lengthened longitudinally in the direction of the cabin as required.

Through the observation port 4 a vertical visual frame of reference is obtained underneath the aircraft. Loss of sightings of the suspended load, which often occurs when using bubble door devices, as a result of skid tubes 5 and also footboards 14, is excluded.

The observation port 4 is free from such structural parts 13 and/or control rods. As a result of the unrestricted view through the observation port 4 the suspended load, or similar, which is connected on the load hook with the length-independent load cable, is viewed in an unhindered manner.

The pilot, who pilots the aircraft from the pilot's seat 2, when using the observation port 4 can assume an ergonomic position in front of the instrument panel, on which the flight and engine instruments are positioned. In that the observation port 4 is inserted on the left-hand side of the pilot's seat, in the case of suspended load deployments the head is accordingly rotated to the left, towards the centre of the helicopter and towards the side of the collective pitch control lever 6, which for the pilot on the pilot's seat 2 greatly simplifies control using the left hand, and in addition raises the level of flight safety. In that in the case of suspended load missions his head is positioned exactly in front of the flight instruments, just an eye movement is sufficient in order to monitor the suspended load and/or read the instrument data, which further provides for additional flight safety.

REFERENCE SYMBOL LIST

0 Helicopter cabin
1 Instrument panel
2 Pilot's seat
3 Co-pilot's seat
4 Observation port
   15 Inner screen
   16 Outer screen
   42 Longitudinal wall
   43, 43' Transverse wall (front/rear)
5 Skid tube
6 Collective pitch control lever
7 Opening angle
8 Cockpit input console
9 Cabin floor
10 Pilot's seat door
12 Co-pilot's seat door
13 Primary structure
14 Footboard
17 Outer skin
20 Roller shutter
21 Floor insert
S Nose
L Longitudinal axis
T Depth

The invention claimed is:

1. A helicopter comprising:
an interior observation port in an interior surface of a helicopter cabin, which is positioned between a pilot's seat and a co-pilot's seat, extending completely through the interior surface from a cabin floor to an outer skin of the helicopter cabin;
an opening of the interior observation port to the interior surface of the helicopter cabin, covered with an inner transparent panel;
an exterior observation port in an exterior surface of the helicopter cabin, disposed on the outer skin of the helicopter cabin and aligned with the interior observation port; and
an opening of the exterior observation port to the exterior surface of the helicopter cabin, covered with an outer transparent panel and connected in a releasable or a non-releasable manner.

2. The helicopter in accordance with claim 1, wherein the inner transparent panel is arranged flush with the plane of the cabin floor.

3. The helicopter in accordance with claim 1, wherein the opening of the interior observation port extends along the longitudinal axis, and the inner transparent panel extends at least approximately from an instrument panel to the backrest of the pilot's seat.

4. The helicopter in accordance with claim 1, wherein the walls of the interior observation port form parts of the interior surface of the helicopter cabin.

5. The helicopter in accordance with claim 1, wherein the interior observation port is delimited from the interior surface of the helicopter cabin 13 by a front transverse wall and a rear transverse wall running at least approximately at right angles to the longitudinal axis.

6. The helicopter in accordance with claim 5, wherein at least one part of the front transverse wall and/or the rear transverse wall has an opening angle of at least approximately 10° between the interior observation port longitudinal axis and the at least one part of the respective transverse wall.

7. The helicopter in accordance with claim 1, wherein the inner transparent panel is protected by a covering, for example, by a roller shutter.

8. The helicopter in accordance with claim 1, wherein the inner transparent panel is replaceable with a floor insert.

9. The helicopter in accordance with claim 1, wherein the outer transparent panel is arranged flush with the plane of the outer skin of the exterior surface of the helicopter cabin, as a result of which the aerodynamic properties of the outer skin remain almost unaltered.

10. The helicopter cabin in accordance with claim 1, wherein at least one of the inner and outer transparent panels are sized and configured to maintain the structural integrity of at least one of the interior surface and the exterior surface of the helicopter cabin.

11. The helicopter cabin in accordance with claim 10, wherein the observation port forms a part of the interior surface, and is connected with the interior surface in a non-releasable manner.

12. A helicopter fuselage having a forward facing windscreen comprising:
an exterior surface forming a lower portion of the fuselage including a first aperture formed aft of the windscreen;
a first transparent panel disposed within the first aperture;
an interior surface forming a floor within the fuselage including a second aperture, the second aperture aligned in overlapping relation to the first aperture; and a second transparent panel disposed within the second aperture.

13. The helicopter fuselage of claim 1, wherein at least one of the first and second transparent panels are sized and configured to maintain the structural integrity of at least one of the exterior surface and the interior surface.

14. The helicopter fuselage of claim 1, wherein the second aperture is positioned between a pilot seat and a co-pilot seat.

15. The helicopter fuselage of claim 1, wherein at least one of the first and second transparent panels forms at least one of a concave and convex shape.

16. The helicopter fuselage of claim 1, wherein a protective cover is removably attached to at least one of the first transparent panel and second transparent panel.

17. The helicopter fuselage of claim 16, wherein the protective cover is a roller shutter.

18. The helicopter fuselage of claim 1, wherein the second transparent panel may be covered by a floor insert.

19. The helicopter fuselage of claim 1, wherein at least one of the first transparent panel and the second transparent panel are connected in a releasable manner.

20. A helicopter fuselage having a forward facing windscreen comprising:
   an exterior surface forming a lower portion of the fuselage including a first aperture formed aft of the windscreen;
   a first transparent panel disposed within the first aperture and sized and configured to maintain the structural integrity of the exterior surface;
   an interior surface forming a floor within the fuselage including a second aperture, the second aperture aligned in overlapping relation to the first aperture and positioned between a pilot seat and a co-pilot seat; and
   a second transparent panel disposed within the second aperture and sized and configured to maintain the structural integrity of the interior surface.

* * * * *